United States Patent [19]

Wohlert

[11] 4,140,932
[45] Feb. 20, 1979

[54] PULSE GENERATOR

[75] Inventor: Andrew M. Wohlert, St. Charles, Ill.

[73] Assignee: Riverbank Laboratories, Geneva, Ill.

[21] Appl. No.: 740,427

[22] Filed: Nov. 10, 1976

[51] Int. Cl.² .......................................... H02K 35/02
[52] U.S. Cl. ....................................... 310/15; 310/30;
315/130
[58] Field of Search ................................. 310/12–15,
310/30, 16, 25; 340/17; 322/3

[56] References Cited
U.S. PATENT DOCUMENTS

| | | | |
|---|---|---|---|
| 2,286,897 | 6/1942 | Costa et al. ............................ | 310/25 |
| 2,740,946 | 4/1956 | Geneslay .................................. | 340/17 |
| 2,900,592 | 8/1959 | Baruch .................................... | 322/3 X |
| 3,100,292 | 8/1963 | Warner, Jr. et al. ................... | 340/17 |
| 3,133,214 | 5/1964 | Lawson et al. ......................... | 310/15 |
| 3,453,573 | 7/1969 | Kyle ....................................... | 310/15 X |
| 3,504,320 | 3/1970 | Engdahl et al. ....................... | 336/110 |
| 3,610,973 | 10/1971 | Bauer et al. ............................ | 310/15 |
| 3,736,448 | 5/1973 | Hekel, Jr. et al. ..................... | 310/15 |
| 3,869,641 | 3/1975 | Goldberg .............................. | 315/130 X |

Primary Examiner—Donovan F. Duggan
Attorney, Agent, or Firm—Edmond T. Patnaude

[57] ABSTRACT

An axially polarized bar magnet is slidably disposed in a non-conductive, non-magnetic tube on which two serially connected oppositely wound induction coils are disposed, the coils being spaced apart by a distance less than the effective length of the magnet.

6 Claims, 4 Drawing Figures

PULSE GENERATOR

The present invention relates in general to methods and apparatus for generating electricity, and it relates in particular to a new and improved method and apparatus for converting mechanical energy into electrical pulses.

BACKGROUND OF THE INVENTION

It is well known that electricity is generated in an electric coil when the coil is linked by a changing magnetic field, and electric generators wherein pistons carrying permanent magnets are reciprocally driven back and forth through a coil are known in the prior art. These latter generators have not, however, been widely used.

There is at the present time a need for a small, low power, electric pulse generator which responds to reciprocation of the generator itself to provide electric pulses which may be used, for example, to energize light sources such as light emitting diodes, hereinafter referred to as LEDs. Such diodes operate at very low power levels but require a substantial initial voltage to render them conductive. Accordingly, a generator for use with LEDs should preferably provide a relatively high output voltage even though the actual power output need not be high.

SUMMARY OF THE INVENTION

Briefly, in accordance with the present invention there is provided an electric pulse generator comprising a non-magnetic, non-conductive tube in which an axially polarized permanent magnet is slidably disposed. A pair of serially connected induction coils, respectively wound in opposite directions, are mounted in spaced relationship on the tube. The distance between the coils is made less than the length of the magnet and the length of each coil is also made less than the length of the magnet. As a consequence, as the magnet moves through the coils a pulse is generated having a voltage level substantially twice that of a pulse generated by a similar magnet moving through a single coil having a number of turns equal to the combined number of turns of the two coils.

BRIEF DESCRIPTION OF THE DRAWING

Further objects and advantages and a better understanding of the present invention can be had by reference to the following detailed description, wherein.

DETAILED DESCRIPTION OF THE INVENTION

Figure 1:
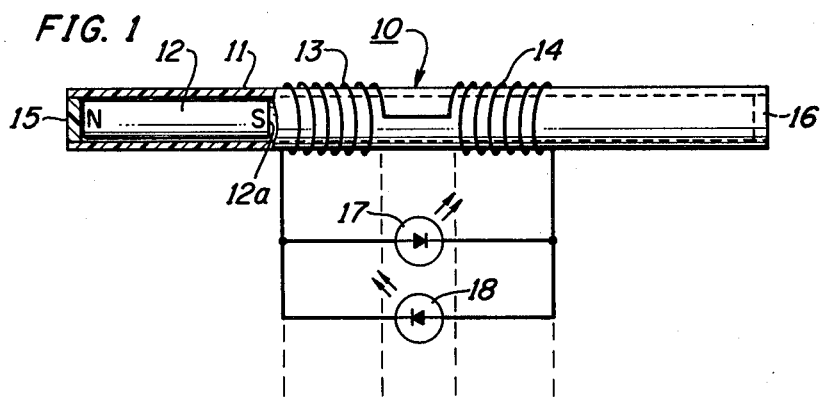
FIG. 1 is a schematic illustration of a pulse generator embodying the present invention.

Referring to FIG. 1, an electric pulse generator is identified by the reference character 10 and comprises a non-magnetic, non-conductive tube 11 formed, for example, of rolled paper or plastic, an axially polarized permanent magnet 12 slidably disposed in the tube 11, and a pair of oppositely wound, serially connected coils of insulated wire 13 and 14. The coils are spaced apart and located on an intermediate portion of the tube 11 so that the magnet 12 may move completely out of the coils while remaining in the end portions of the tube 11. If electric pulses are to be generated by reciprocating the tuube 11 in an axial direction whereby the magnet 12 moves back and forth through the coils 13 and 14, the ends of the tube 11 should be closed as, for example, by means of a pair of end caps 15 and 16. Although the generator 10 has other applications it is well suited for energizing one or more LEDs and therefor a pair of such diodes 17 and 18 are shown connected in parallel across the coils in opposite directions of polarity.

Figure 2:
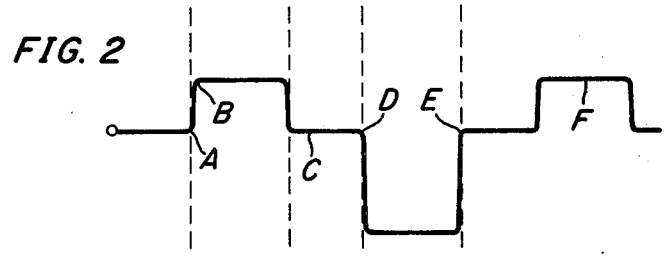
FIG. 2 illustrates voltage wave form useful in understanding the operation of the generator of FIG. 1.

In order to facilitate an understanding of the manner in which electric pulses are generated across the LEDs 17 and 18 as the magnet 12 moves from one end of the tube 11 to the other, reference should be made to FIG. 2 wherein the theoretical voltage wave form generated when the magnet moves through the coils is illustrated. It will be understood that the amplitude of the pulses generated is related to the strength of the magnet, the number of turns in the coils and the speed of the movement of the magnet through the coils. In plotting the waveform of FIG. 2 it was assumed that the coils 13 and 14 are mutually symmetrical and uniformly wound.

As the magnet moves from left to right in the tube 11 the output voltage across the coils remains at zero until the magnetic flux from leading edge 12a of the magnet begins to link the turns of the coil 13. This position is indicated in FIG. 2 as position A. The voltage then steeply rises until the rate of change of the flux linking the coil 13 becomes constant. This position is indicated at B. The voltage level thereafter remains constant until the leading edge 12a of the magnet exits the coil 13 whereupon the flux change becomes zero and the voltage generated across the coil 13 becomes zero as shown in C.

As the leading edge 12a enters the coil 14 a voltage is generated across the coil 14. Also, as the trailing edge passes through the coil 13 a voltage is generated across the coil 13. By selecting an effective magnet length which substantially equals the distance between the corresponding ends of the coils 13 and 14, voltages are simultaneously generated across each of the coils 13 and 14 as the leading edge 12a of the magnet moves through the coil 14 and the trailing edge of the magnet moves through the coil 13. These two voltages are mutually superimposed by virtue of the fact that the coils are connected in series. Inasmuch as the coils are wound in opposite directions the two voltages are of the same polarity as the magnet 12 moves into the coil 14 and out of the coil 13. This double amplitude voltage pulse begins at point D and ends at point E, the leading edge of the pulse occurring when the leading edge of the magnet enters the coil 14 and the trailing edge of the magnet commences to move through the coil 13. The trailing edge of the pulse, point E, occurs when the trailing edge of the magnet exits the coil 13. The pulse F occurs as the trailing edge of the magnet 12 moves through the coil 14. When the magnet 12 moves back through the coils from right to left, a wave form inverse to that of FIG. 2 is generated.

In the above description of the wave form shown in FIG. 2, the effective length of the magnet may be assumed to be the actual length. In reality, however, the effective length is less than the actual length by an amount dependent on the magnet design and material. The effective length of a cylindrical bar magnet may be, for example, seventy percent of the actual length of the magnet.

For those applications wherein the generator 10 is used to energize LEDs, the LEDs will generally be selected so as to have a forward conducting voltage intermediate the high and low pulse values so that the LEDs are energized only by the high value pulse.

Figure 3:
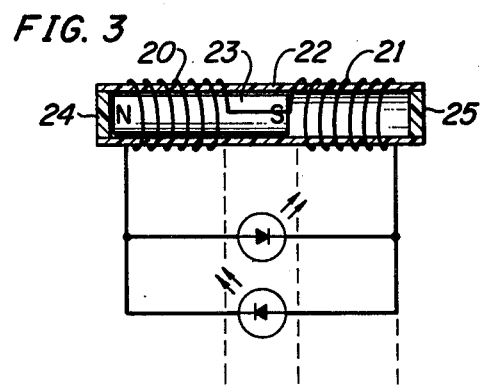
FIG. 3 is a schematic illustration of another pulse generator embodying the present invention.
Figure 4:
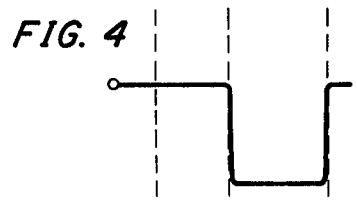
FIG. 4 illustrates a voltage wave form useful in understanding the operation of the generator in FIG. 3.

In FIG. 3 there is shown an embodiment of the invention wherein the low voltage pulses are eliminated thereby enabling the use of a substantially shorter unit. While it might appear that the desired number of turns could be wound on a small area of the tube, it should be recognized that the results would not be satisfactory because the size of the device would be greater, the resistance of the coil would be greater, and the amount of wire used would be greater. Also, of course the weight of the device would be necessarily greater. Therefore, in accordance with the present invention as shown in FIG. 3, a pair of spaced apart, oppositely wound, serially connected coils 20 and 21 of insulated wire are positioned on a non-conductive, non-magnetic tube 22 in which an axially polarized, bar magnet 23 is slidably disposed. The magnet 23 has an effective length about equal to or slightly greater than the distance between the corresponding ends of the coils 20 and 21 when it is in each end position in the tube. As a consequence, the high voltage pulse is generated for substantially the entire range of movement of the magnet. This pulse is illustrated in FIG. 4, its time duration being the period during which the magnet moves from one end of the tube to the other.

The end caps 24 and 25 may be formed of a resilient material so that the magnet bounces back and forth between the end caps when the unit is shaken in an axial direction or when a sudden sharp axial force is applied to the unit.

The voltage generator and pulsating light source of the present invention may thus be seen to be small and compact in size. Moreover, it is durable in construction and has a lifetime of unlimited duration because it does not require any recharging or replacement of the energy source. It can, therefore, be mounted in inaccessible locations where battery mounted devices would not be feasible.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. An electric generator, comprising
   a non-magnetic, non-conductive tube having closed ends,
   an elongated permanent bar magnet slidably disposed in said tube for uninterrupted movement through said tube in the direction of the polar axis of said magnet,
   first and second coils disposed in spaced relationship on said tube so that said magnet moves sequentially through said coils as it slides through said tube from one of said closed ends to the other,
   said coils being wound in mutually opposite directions and connected together in series,
   said magnet having an effective polar length greater than the distance between said coils and less than the distance between the outer ends of said coils and
   the distance between the outer end of one of said coils and the adjacent one of said closed ends of said tube being at least as great as the length of said magnet.

2. An electric generator according to claim 1 wherein
   the distance between the outer end of the other of said coils and the respectively adjacent closed end of said tube also being at least as great as the length of said magnet.

3. An electric generator according to claim 1 comprising
   a light emitting diode connected across the series connection of said coils.

4. Apparatus according to claim 1 wherein
   the effective length of said magnet is substantially equal to the distance between corresponding ends of said coils.

5. A method of generating electric pulses which method comprises causing an axially polarized permanent magnet to move back and forth completely through a pair of serially connected, oppositely wound coils which are spaced apart by a distance less than the effective length of the magnet.

6. An electric generator, comprising
   a nonmagnetic, non-conductive tube having closed ends,
   an elongated permanent bar magnet slidably disposed in said tube for movement through said tube in the direction of the polar axis of said magnet, and
   first and second coils disposed in spaced relationship on said tube so that said magnet moves sequentially through said coils as it slides through said tube from one of said closed ends to the other,
   said coils being wound in mutually opposite directions and connected together in series,
   said magnet having an effective polar length greater than the distance between said coils and less than the distance between the outer ends of said coils,
   the distance between the outer end of one of said coils and the adjacent one of said closed ends of said tube being at least as great as the length of said magnet,
   the distance between the outer end of the other of said coils and the respectively adjacent closed end of said tube also being at least as great as the length of said magnet,
   first and second light emitting diodes being connected in parallel across the series connection of said coils,
   said diodes being oppositely polarized relative to said coils, and
   said diodes having a forward conducting voltage less than the voltage developed across said coils as said magnet is moving through both said coils at a predetermined velocity but greater than the voltage developed across said coils as said magnet moves at said velocity through only one of said coils.

* * * * *